(12) United States Patent
Eustace et al.

(10) Patent No.: US 6,470,362 B1
(45) Date of Patent: *Oct. 22, 2002

(54) EXTRACTING ORDERED LIST OF WORDS FROM DOCUMENTS COMPRISING TEXT AND CODE FRAGMENTS, WITHOUT INTERPRETING THE CODE FRAGMENTS

(75) Inventors: Robert Alan Eustace, Redwood City, CA (US); Jeremy Dion, Palo Alto, CA (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/857,458
(22) Filed: May 16, 1997
(51) Int. Cl.[7] .................................................. G06F 7/00
(52) U.S. Cl. ........................................ 707/500; 707/513
(58) Field of Search ................................. 707/517, 513, 707/514, 520, 522, 523, 532, 9, 10, 500

(56) References Cited

U.S. PATENT DOCUMENTS

| | | | | |
|---|---|---|---|---|
| 4,843,389 A | * | 6/1989 | Lisle et al. ................ 341/106 |
| 4,864,502 A | * | 9/1989 | Kucera et al. ................ 704/8 |
| 5,146,406 A | * | 9/1992 | Jensen ........................... 704/9 |
| 5,161,245 A | * | 11/1992 | Fenwick ..................... 382/231 |
| 5,392,212 A | * | 2/1995 | Bralich et al. ................ 704/9 |
| 5,418,948 A | * | 5/1995 | Turtle ......................... 395/600 |
| 5,613,117 A | * | 3/1997 | Davidson et al. ........... 395/708 |
| 5,642,522 A | * | 6/1997 | Zaenen et al. .............. 395/794 |
| 5,832,530 A | * | 11/1998 | Paknad et al. .............. 707/500 |
| 5,914,679 A | * | 11/1998 | Burrows ...................... 341/76 |
| 5,903,860 A | * | 5/1999 | Maxwell, III et al. .......... 704/9 |
| 5,982,929 A | * | 11/1999 | Ilan et al. ................... 382/200 |
| 5,999,664 A | * | 12/1999 | Mahoney et al. ........... 382/305 |
| 6,014,460 A | * | 1/2000 | Fukushima et al. ......... 382/177 |
| 6,016,493 A | * | 1/2000 | Burrows ..................... 707/101 |
| 6,023,760 A | * | 2/2000 | Karttunen ................... 712/300 |

\* cited by examiner

*Primary Examiner*—Heather R. Herndon
*Assistant Examiner*—Cesar B. Paula
(74) *Attorney, Agent, or Firm*—Fenwick & West LLP (57) ABSTRACT

A computer implemented method is applied to convert a formatted document or text to an ordered list of words. The formatted document is first partitioned into first and second data structures stored in a memory of a computer. The first data structure stores text fragments, and the second data structure stores code fragments of the formatted document. Adjacent text fragments are concatenated to form possible ordered word lists. Possible words are matched against a dictionary of representative words. A best ordered word list having the fewest number of words is selected from the possible ordered word lists.

21 Claims, 6 Drawing Sheets

EXTRACTING ORDERED LIST OF WORDS FROM DOCUMENTS COMPRISING TEXT AND CODE FRAGMENTS, WITHOUT INTERPRETING THE CODE FRAGMENTS

FIELD OF THE INVENTION

This invention relates generally to converting documents, and more particularly to converting documents that are formatted with a mark-up language.

BACKGROUND OF THE INVENTION

PostScript and its variant Portable Document Format (PDF) are standard mark-up languages for formatting documents produced by word processing software programs. With a mark-up language, it is possible to exactly reproduce text, graphics, and bit maps (generally "text") on a printed page or display screen. As an advantage formatted documents are easily communicated and processed by many different types of output devices.

In formatted document files, text fragments and formatting commands for rendering the text are interleaved. The formatted documents are processed by interpreters. An interpreter reads the formatted file to "execute" the commands so that the location of the dots of ink on the page or the pixels on a screen can exactly be determined. The interpreter does not exactly deal with words or sentences, but with the more fundamental document components such as characters, lines, and graphics.

An excerpt from a PostScript formatted document may include the following commands and text:

"%!PS-Adobe-2.0 . . . 16b(Re)o(ad)f(b)q(et)o(we)o(en)I (the lines!)."

In PostScript, text fragments are enclosed-in parenthesis, and the commands are interspersed among the text. A text fragment can be a single character, a sequence of characters, a word, or parts of multiple words delimited by, perhaps, blanks and punctuation marks. As shown in the example above, words may often by split over several fragments so that the beginning and ends of the words themselves are difficult to discern.

The commands between the text fragments move the cursor to new positions on the page or new coordinates on the display, usually to modify the spacing between the letters and lines. Word separators, such as space characters visible in plain text, are usually not indicated in the formatted text, instead explicit cursor movement commands are used. Hence, word separators only become apparent as more white space when the text is rendered.

The general problem of determining where words start and end, i.e., word ordering, is difficult. PostScript does not require that characters be rendered in a left-to-right order on lines, and a top-to-bottom order on the page or display. Indeed, the characters may be rendered in any order and at arbitrary positions.

Therefore, the only completely reliable way to identify words in a formatted document is to interpret the commands down to the character level, and to record the position and orientation of the characters as they are rendered. Then, characters that are close enough together on the same line, according to some threshold, and taking the character's font and size into consideration, are assumed to be in the same word. Those characters which are farther apart than the threshold are assigned to different words.

Finding the correct position of each character is particularly useful when rendering text for reading, since tabs, line spacing, centering, and other visual formatting attributes facilitate comprehension of the text. As is evident, exactly locating words in formatted text can be computationally more expensive than just simply rendering the text for reading.

This becomes a problem if it is desired to automatically process formatted document in order to create, for example, an index of the words. On the World Wide Web (the "Web"), many documents are available in PostScript (or PDF) formats. This allows users of the Web to exactly reproduce graphically rich documents as they were originally authored.

In order to locate documents of interest on the Web, it is common to use a search engine such as AltaVista (tm) or Lycos (tm). With a search engine, the user specifies one or more key words. The search engine then attempts to locate all documents that include the specified key words. Now the exact location of the words on the page is of minimal interest, only their respective ordering.

Some known techniques for indexing formatted documents, such as by using the PostScript interpreter Ghostscript, perform a total interpretation of the formatting commands, and apply some other heuristic to recover word delineations. This takes time.

A simple sampling of the Web would seem to indicate that the Web contains hundreds of thousands of formatted documents having a minimum total projected size of some 40 Gigabytes. With traditional formatted document parsing techniques, which can process about 400 bytes per second, it would take about 1200 days to index the bulk of the current PostScript formatted Web documents. Given the rapid growth of the Web, indexing the Web using known techniques would be a formidable task.

SUMMARY OF THE INVENTION

We provide a high-speed computer implemented method for converting a formatted document to an ordered list of words. Our method can, on an average, convert formatted Web documents about fifty times faster than known methods.

According to our method, the formatted document is first partitioned into first and second data structures stored in a memory of a computer by separately identifying text and code fragments of the formatted document. The first data structure stores the text fragments, and the second data structure stores the code fragments of the formatted document.

Adjacent text fragments are locally concatenated and matched against a word dictionary to form possible ordered word lists. This list contains every possible word that could be made from the text fragments contained in the document. A best ordered word list is formed by choosing a set of words that includes all of the text fragments and contains the fewest number of words.

In one aspect of the invention, we organize the text and code fragments as arcs and nodes of a graph. The nodes represent the code fragments, or equivalently the gaps between text fragments. In addition, the nodes define all places where a word might begin or end. An arc between two nodes represents the possibility of concatenating the intervening text fragments into a single word. The best possible word list is the one which can be graphically represented by the smallest chain of arcs starting at the first node and ending at the last node, and where each arc ends at a node where the next arc begins. This corresponds to a covering of the text fragments with the smallest number words, each word defined by one arc. In the case where there are multiple best ordered lists, we select the one with the highest minimum weight. The weight of an arc is determined by the number of times the word defined by the arc is used in a large corpus of documents.

In another aspect of the invention, the best possible word list is used to annotate the code fragments to show whether they represent a word break or not. Because code fragments reoccur frequently in documents, this accumulation of local information allows for a global determination to be made whether a particular code fragment is more likely to bind adjacent text fragments into a word, or to separate them. The global determination is used to correct occasional errors in the local matching.

DETAILED DESCRIPTION OF PREFERRED EMBODIMENTS

We propose a method for converting a document to an ordered word list without performing a full interpretation of the commands that format the document. The ordered word list can be indexed, or simply printed or displayed as text for perusal. We take advantage of the observation that in order to just produce an ordered list of words from the formatted document, it is not necessary to generate a perfectly formatted output.

In theory, the characters which compose a document can be rendered in any order, however in practice, document formatting systems invariably render text fragments in the same order as they would be read. Thus, the order of the parenthetical text fragments in, for example, a PostScript formatted document is their correct order in the output text.

This means a full interpretation of the commands, for the purpose of indexing words, is not necessary. We propose that a formatted document first is partitioned and organized in a memory as two separate data structures. A first data structure stores text fragments in their correct order. The fragments can be located by sequentially reading the document and identifying parenthetically enclosed strings of characters. The second data structure simply stores the remaining fragments, e.g., the commands that are interspersed among the text. We call these code fragments.

Figure 1:
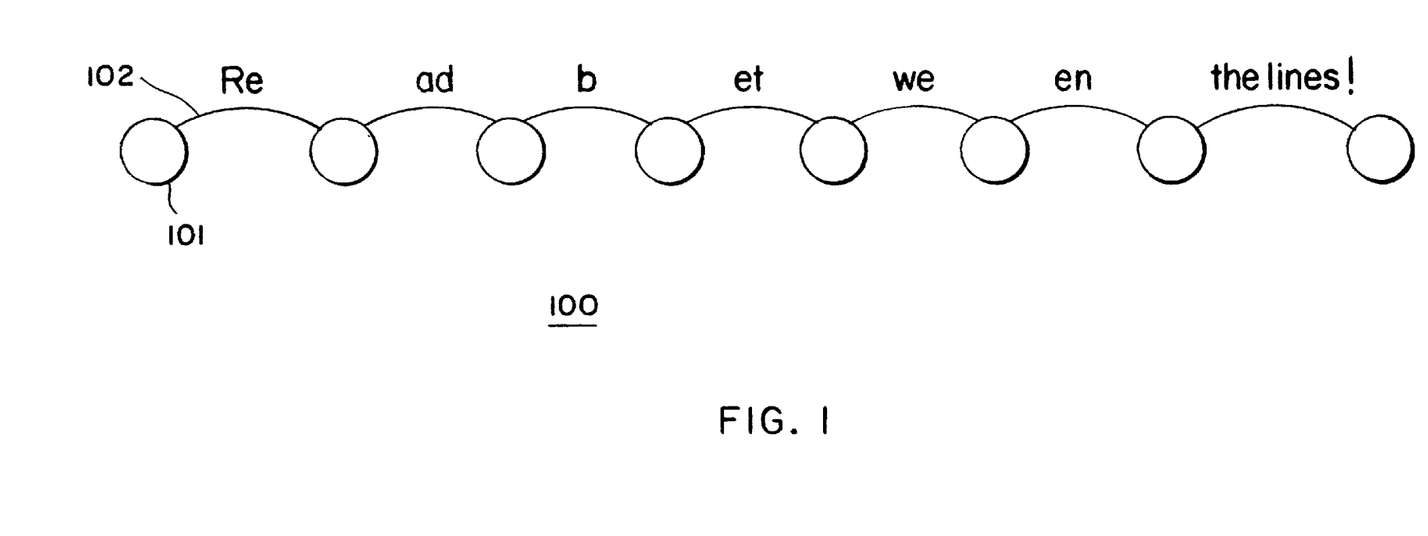
FIG. 1 is a graph showing text and code fragments of a formatted document represented as arcs and nodes.

FIG. 1 shows how we represent the organization of the partitioned documents as a graph 100. In FIG. 1, the first data structure is represented by arcs 102, e.g., the text fragments. The code fragments that separate arcs 102 are represented by nodes 101. Each node 101 represents a position where a break between words may occur.

At this point in order to recover the words, a number of different concatenations of the text fragments are possible, for example:

Re ad b et weenthe lines!
Re ad bet we en the lines!
Re ad b et ween the lines!
Re ad bet ween the lines!
Re ad between the lines!
Read b et we en the lines!
Read bet we en the lines!
Read bet we en the lines!
Read bet ween the lines!
Read between the lines!

We now make a second observation. A reader when faced with a string such as: "Readbetweenthe lines" tries to find the "best fit" of recognizable words in the string. We suggest a computer implemented method that mimics this behavior.

Potential "words" are looked up (or matched) in a frequency-weighted dictionary of words. For example, the dictionary that is maintained by the AltaVista search engine can be used. This dictionary reflects word usage in a large corpus of Web documents and newsletters. Associated with each word is a frequency count of how often each word occurs in the corpus as a whole.

Figure 2:
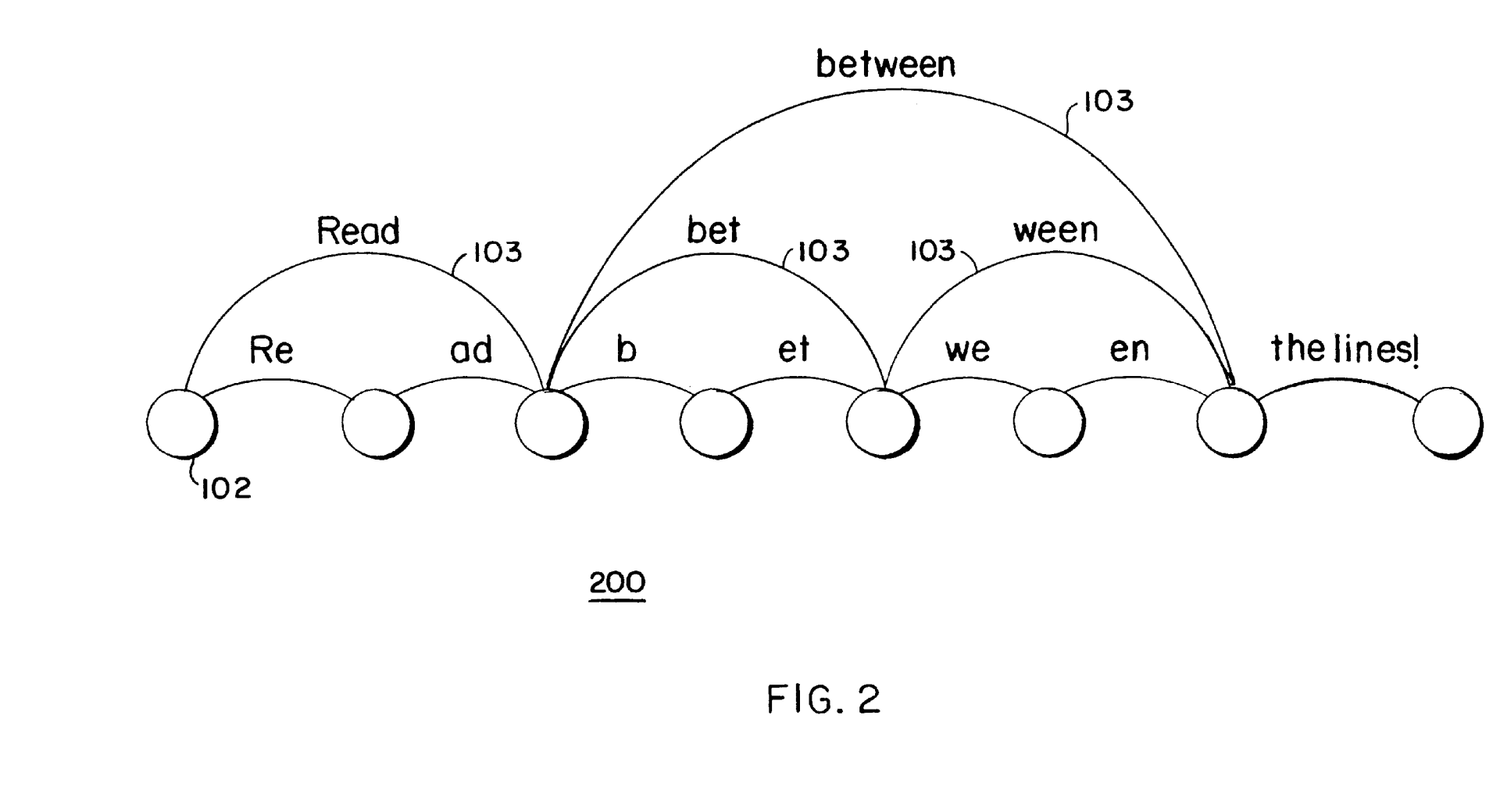
FIG. 2 is an augmented graph showing possible choices of words in the formatted document.

As shown in FIG. 2, by looking-up possible text fragment combinations in the dictionary, we can generate an augmented graph 200 with additional arcs 103 which represent local concatenations of adjacent fragments to form possible words. The concatenations can readily be represented in the first data structure using, for example pointers, or special delimiters.

There are many possible pathways (orderings) through the graph 200. In one embodiment of the invention, a best ordering of words is along the path which has the fewest number of arcs, e.g., "Read between the lines!" This path corresponds to a possible ordering which has the fewest number of words. Documents partitioned and organized in this manner can form the basis for how the words of the document are ordered and indexed without any time consuming interpretation or processing of the formatting commands themselves.

Figure 3:
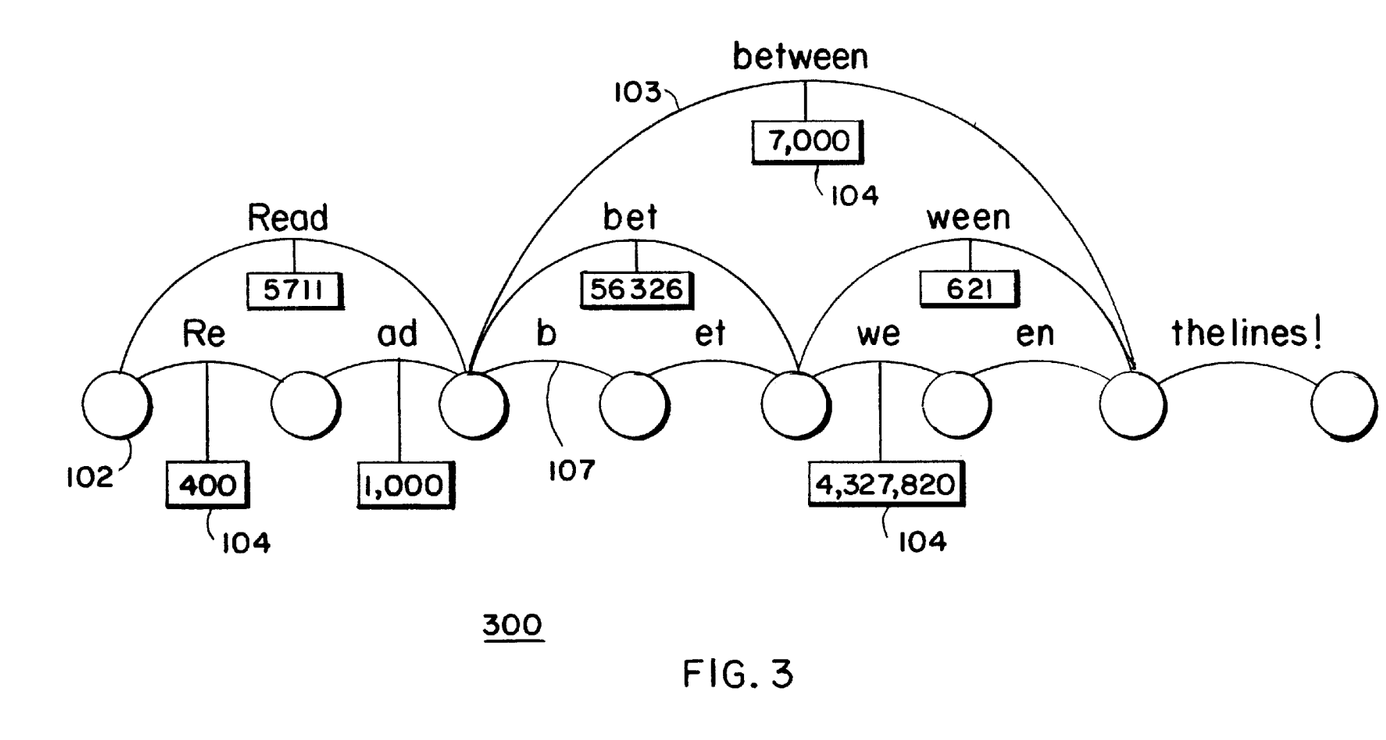
FIG. 3 is the augmented graph including weighted orderings of the words.

As shown in the graph 300 of FIG. 3 for one variation on our embodiment, we can also weigh each arc by the word's frequency 104 as determined from a large corpus of documents. Then, our best path algorithm can factor in these weights during the best path determination. For example, if there are multiple best paths with the identical number of fewest arcs, i.e., a tie, then the weighted arcs can be sorted in ascending order, and the path with the largest minimally weighted arc is selected.

For example, consider the case where there are two possible paths of three arcs each. The sorted weights in the first path are {300, 800, 1300} and sorted weights in the second path are {300, 600, 1200}. The best path is found by parsing each list from lowest to highest weight and choosing the first path with a higher value weight. In this case, the first path is selected, since the first element in both lists is the same (300), and the second element in the first path is larger (800>=600). Intuitively, this algorithm avoids paths that contain very uncommon words, and therefore, this strategy tends to penalizes sentences which uses rare, or "low" weight words.

We realize that in some cases the best path chosen as described above is the wrong path. For example, if any of the words of the original document are not found in the dictionary, then we cannot completely augment the graph. There may also be other rare cases where the path with the fewest number of arcs does not exactly reflect the word separation as intended by the formatting commands.

Therefore, we also propose a method which can be applied to the second data structure, i.e., the nodes 102, to improve the accuracy of output sequential word list. This is described with reference to graph 400 of FIG. 4. Here, we rely on a third observation which can be made about formatted documents.

Figure 4:
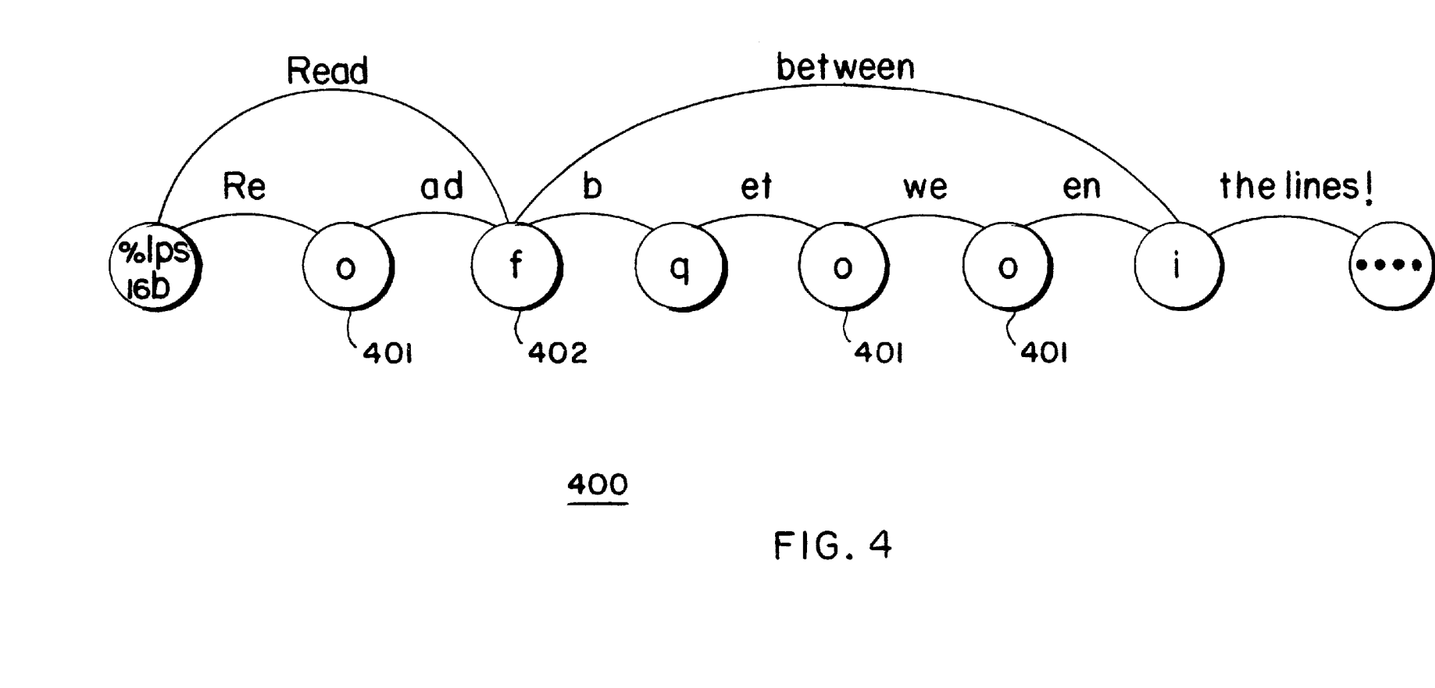
FIG. 4 is a graph showing code fragments used as disjunctions and conjunctions of the text fragments.

When a code fragment is used repeatedly in a document, such as the code fragment "o" of nodes 401 separating the fragments "(Re)o(ad)," "(et)o(we)," and "(we)o(en)," the code fragment is almost always used in a consistent way throughout the document. For example, the code fragment either adds a small spacing within the word, or a large spacing between words, but almost never both.

This means that it is possible to use our local word matching technique above to accumulate information about how the code fragments are used to bind the text fragments without actually interpreting the commands. If word matching suggests that all uses of the code fragment "o" are within a word, then in the few cases in which the local matching technique might have indicated a use between words, those guesses are probably wrong. Thus, we can use global information about how fragments are concatenated to find local errors in the matches.

In FIG. 4, the best path according to word length and word frequency is highlighted in dark lines. Thus, we would consider the command "f" 402 to 5 be a word separator. Likewise, the command "o" 401 is used as a "conjunction" between text fragments.

Figure 5:
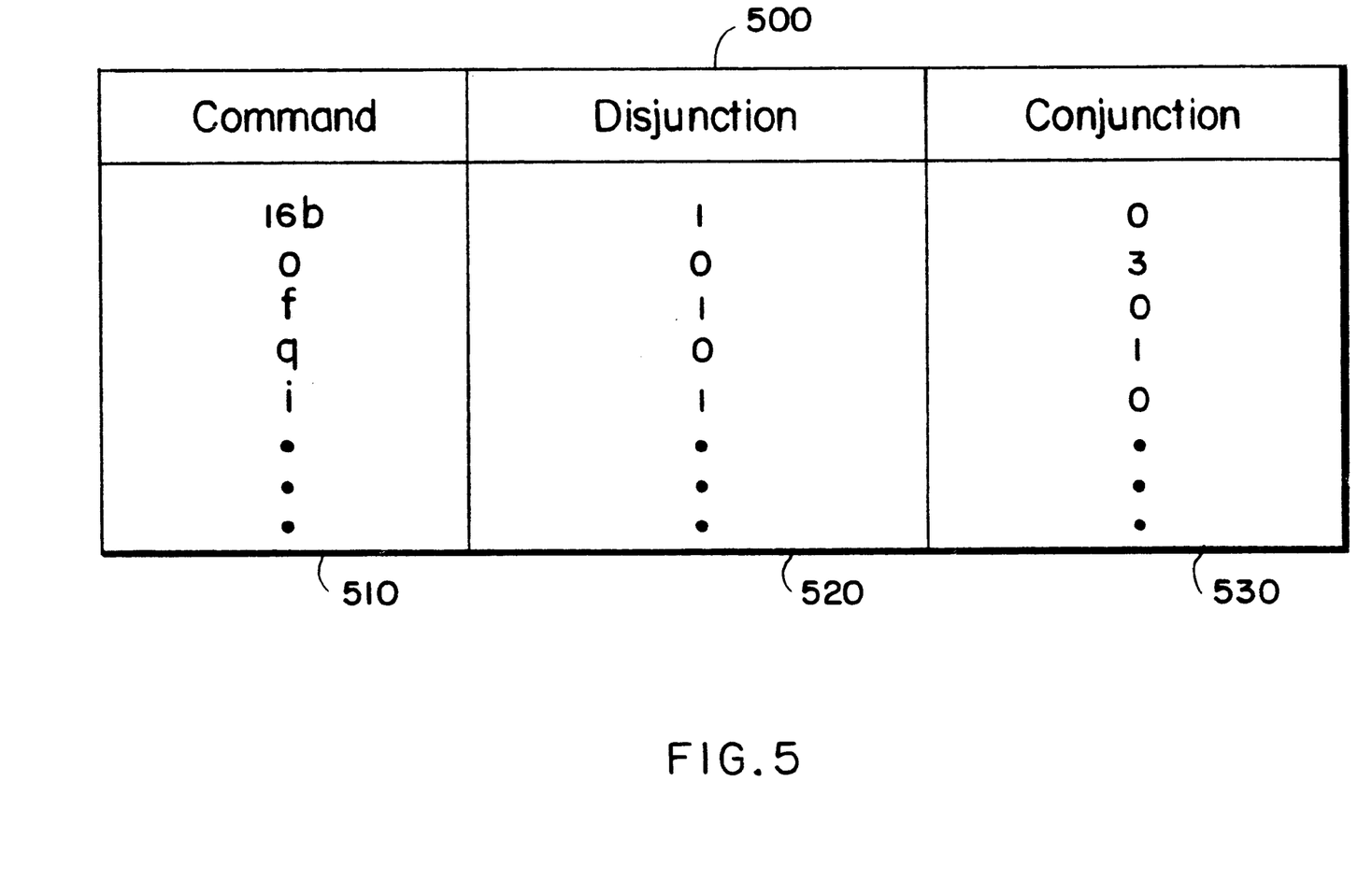
FIG. 5 is a table showing unique code fragment entries.

As shown in FIG. 5, we maintain a table 500 of all code fragments as they are detected. There is one entry 510 in the table for each unique code fragment. Associated with each entry is a "disjunction" field 520 and a "conjunction" field 530.

In order to minimize the amount of memory required, and to accelerate matching, we use a fingerprinting technique to convert the variable length code fragment to fixed length bit strings. Fingerprinting is a well known technique that can convert character strings of arbitrary length to, for example, 64 bit words. As an advantage of fingerprinting, there is only a minute probability that two different character strings will have the same fingerprint. This means that the fingerprints are substantially as unique as the code fragments they represent.

Note that we make no attempt to determine the true meanings or functions of the commands of the code fragments, this would consume time. We "learn" their meanings from the local matching. This means, as an advantage, that our method does not need a complete and detailed grammatical specifications of the many variants of formatting language that can be used.

During word matching, the fields 520 or 530 are appropriately incremented depending on how fragments are locally matched up into words. After matching up all of the text fragments into words, we use the table 500 to make a global decision for each possible code fragment to determine whether our matching guesses were correct. For example, if the code fragment is used more often as a disjunction then as a conjunction, using a simple majority rule, the code fragment can be globally characterized as a word break. Similarly conjunctions of text fragments can be confirmed, or corrected.

During a final pass, we can produce an ordered word list suitable for indexing the document. Alternatively, the words can be printed, displayed or written to a file for further processing by a text editor.

Figure 6:
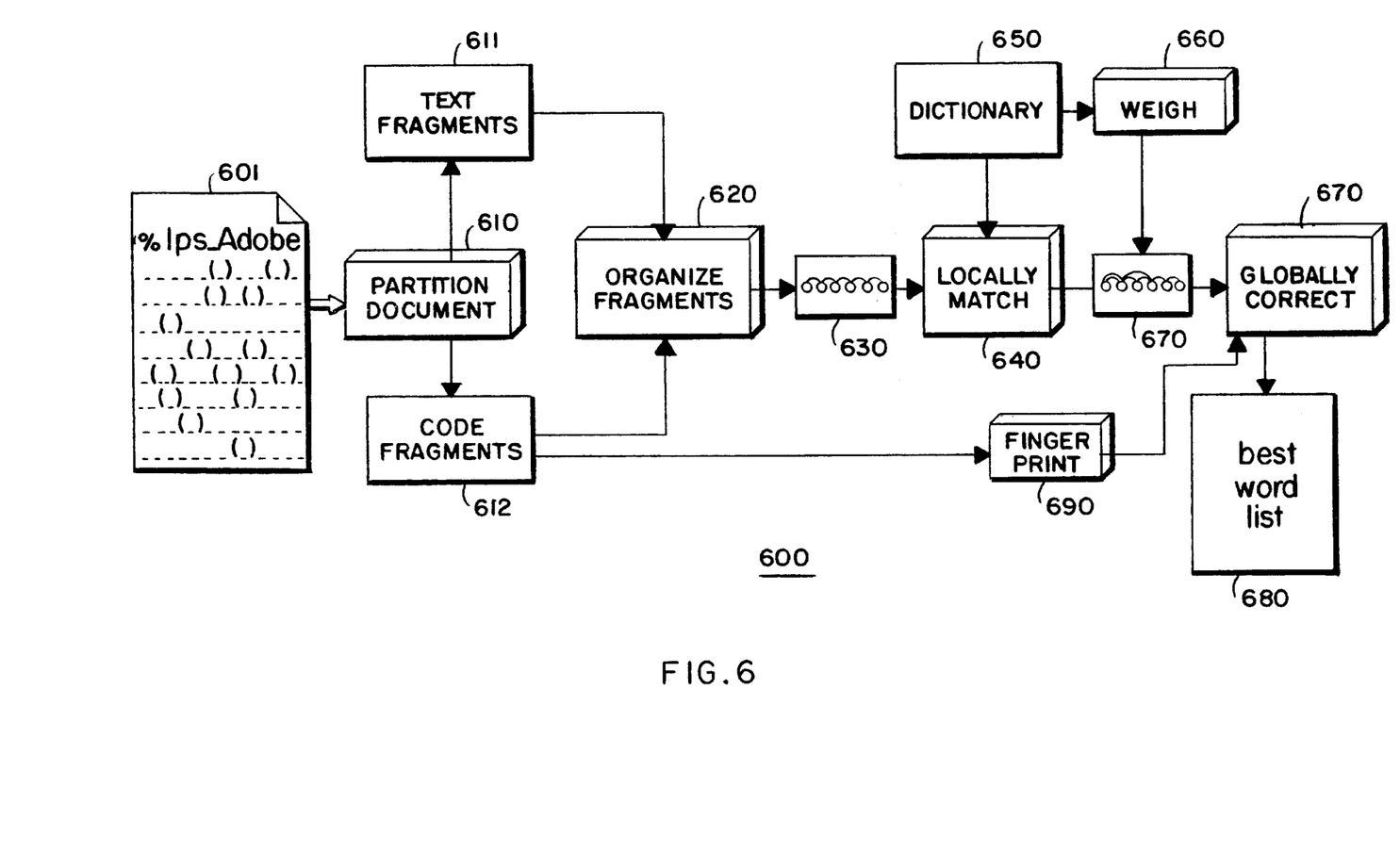
FIG. 6 is flow diagram of a process for converting formatted documents according to the invention.

FIG. 6 shows the data structures and process steps 600 of our preferred embodiment of the invention. A formatted document 601 is partitioned into text fragments and code fragments in step 610. In step 620, the text and code fragments are organized into arcs and nodes of a graph 630. The text fragments are locally matched in step 640 against a word dictionary 650, and optionally weighted (step 660) to generate an augmented graph 670. The code fragments are fingerprinted in step 690 to globally correct the graph in step 670 to produce an ordered best word list 680.

Our processing of the code fragments can be further enhanced to take care of special formatting commands. PostScript often contains special characters that represent other characters. For example, the code fragment "aæ213" might be used instead of "fi" in some character sets, and for "ffi" in others. Our technique can be modified to try both sequences and determine which is more appropriate for forming words.

Furthermore, the technique can be used to recover ordered words from a formatted document in any language which is well represented in the dictionary. Our implementation works well on all major European languages which may include accented characters. For example, characters expressed using the Isolation character set can be handled as a variant of the special characters mentioned above.

Our method can also be applied to documents formatted with other languages such as PDF. With PDF, a formatted document is also compressed within a file. Therefore in this case, we first decompress the file prior to local and global matching.

Described is a method for converting a formatted document to an ordered list of words. The words can be indexed, printed, displayed, or put in a file. Depending on the complexity of the formatted document, our technique, in the worst case, is at least twice as fast as known methods. Some documents we can process several hundred times faster. We estimate that we can index all of the formatted documents accessible via the Web in about 26 days, instead of the estimated three to four years that would be required using competing prior art techniques, a factor of 50 improvement.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

We claim:

1. A computer implemented method for extracting an ordered list of words from formatted text, the formatted text comprising text fragments and code fragments, the method comprising the steps of:

partitioning the formatted text into a first data structure and a second data structure in a memory of a computer, the first data structure for storing the text fragments, the second data structure for storing the code fragments, the partitioning done without interpreting the code fragments;

concatenating adjacent text fragments into ordered lists of possible words using a dictionary of representative words; and selecting at least one ordered list from the ordered lists of possible words, the selected at least one list having the fewest number of words.

2. The method of claim 1 wherein more than one ordered list is selected, and further comprising:

weighting each representative word of the dictionary by the frequency at which the word appears in the text of a representative set of documents; and selecting as a best ordered list of words the list also having a highest minimum word frequency.

3. The method of claim 1 further comprising:

storing each unique code fragment as an entry in a table, each entry also including a disjunction field and a conjunction field; and incrementing the disjunction field when an associated code fragment is used to separate words, and incrementing the conjunction field when the code fragment is used to concatenate adjacent text fragments into a word.

4. A method for extracting an ordered list of words from formatted text, comprising the steps of:

partitioning the text into text fragments and code fragments without interpreting the code fragments;

organizing the text fragments as arcs and the code fragments as nodes in a graph;

matching concatenations of adjacent text fragments against a word dictionary to determine possible paths through the graph; and selecting a particular path having the fewest number of arcs as representing a best ordering of the words of the formatted text.

5. A computer implemented method for extracting an ordered list of words from formatted text, the formatted text comprising text fragments and code fragments, the computer implemented method comprising the steps of:

locating text fragments in the formatted text without interpreting the code fragments;

concatenating adjacent text fragments into ordered lists of possible words using a dictionary of representative words; and selecting a best ordered list from the ordered lists of possible words, the best ordered list including all of the text fragments and having the fewest number of words.

6. The method of claim 1, further comprising:

weighting each representative word of the dictionary by the frequency at which the word appears in the text of a representative set of documents;

sorting the ordered lists of possible words according to the weight of each representative word, a first sorted word list formed from a first ordered list of possible words, and having n representative words $a_1, a_2, \ldots, a_n$, and a second sorted word list formed from a second list of possible words, and having n representative words $b_1, b_2, \ldots, b_n$;

maintaining an index i having possible values between 1 and n, inclusive; and comparing the weights of $a_i$ and $b_i$ further comprising:

setting i to a value of 1;

comparing $a_i$ and $b_i$;

responsive to $a_i$ and $b_i$ having an equal weight and i having a value less than n, successively incrementing i and comparing $a_i$ and $b_i$ for the incremented value of i;

responsive to the weight of $a_i$ being greater than the weight of $b_i$, selecting the first ordered list as the best ordered list; and responsive to the weight of $a_i$ being less than the weight of $b_i$, selecting the second ordered list as the best ordered list.

7. The method of claim 3, further comprising:

responsive to a code fragment being used more often to separate words than to concatenate adjacent text fragments into a word, determining that the code fragment represents a word break; and responsive to a code fragment being used more often to concatenate adjacent text fragments into a word than to separate words, determining that the code fragment does not represent a word break.

8. The method of claim 3, further comprising:

converting the unique code fragments to fixed length bit strings using a fingerprinting technique, prior to storing the code fragments as entries in the table.

9. The method of claim 4, further comprising:

responsive to a plurality of paths having the fewest number of arcs:

assigning a weight to each arc, such that the weight of each arc corresponds to a frequency with which the text fragment associated with the arc appears in the text of a representative set of documents;

comparing the weight of a first arc of a first path having the fewest number of arcs to the weight of a first arc of a second path having the fewest number of arcs;

responsive to the weight of the first arc of the first path having a greater weight, selecting the first path as representing the best ordering of the words of the formatted text;

responsive to the weight of the first arc of the second path having a greater weight, selecting the second path as representing the best ordering of the words of the formatted text;

responsive to the weight of the first arc of the first path being the same as the weight of the first arc of the second path, comparing the weight of at least one subsequent arc in the first path with the weight of at least one subsequent arc in the second path, and selecting as representing the best ordering of the words of the formatted text a path having a first occurrence of an arc with greater weight.

10. A computer program product stored on a computer readable medium for extracting an ordered list of words from formatted text, the formatted text comprising test fragments and code fragments, the computer program product controlling a processor coupled to the medium to perform the operations of:

partitioning the formatted text into a first data structure and a second data structure in a memory of a computer, the first data structure for storing the text fragments, the second data structure storing the code fragments, the partitioning done without interpreting the code fragments;

concatenating adjacent text fragments into ordered lists of possible words using a dictionary of representative words; and selecting a best ordered list from the ordered lists of possible words according to a predetermined selection criterion.

11. The computer program product of claim 10, wherein the best list is the ordered list having the fewest number of words.

12. The computer program product of claim 10, wherein the processor is additionally controlled to perform the operations of:

weighting each representative word of the dictionary by the frequency at which the word appears in the text of a representative set of documents;

sorting the ordered lists of possible words according to the weight of each representative word, a first sorted word list formed from a first ordered list of possible words, and having n representative words $a_1, a_2, \ldots, a_n$, and a second sorted word list formed from a second list of possible words, and having n representative words $b_1, b_2, \ldots, b_n$;

maintaining an index i having possible values between 1 and n, inclusive; and comparing the weights of $a_i$ and $b_i$ further comprising:

comparing $a_i$ and $b_i$;

responsive to $a_i$ and $b_i$ having an equal weight and i having a value less than n, successively incrementing i and comparing $a_i$ and $b_i$ for the incremented value of i;

responsive to the weight of $a_i$ being greater than the weight of $b_i$, selecting the first ordered list as the best ordered list; and responsive to the weight of $a_i$ being less than the weight of $b_i$, selecting the second ordered list as the best ordered list.

13. The computer program product of claim 10, wherein the processor is additionally controlled to perform the operations of:

storing each unique code fragment as an entry in a table, each entry also including a disjunction field and a conjunction field; and incrementing the disjunction field when an associated code fragment is used to separate words, and incrementing the conjunction field when the code fragment is used to concatenate adjacent text fragments into a word;

responsive to a code fragment being used more often to separate words than to concatenate adjacent text fragments into a word, determining that the code fragment represents a word break; and responsive to a code fragment being used more often to concatenate adjacent text fragments into a word than to separate words, determining that the code fragment does not represent a word break.

14. The computer program product of claim 13, wherein the processor is additionally configured to perform the steps of:

repartitioning the formatted text into text fragments and code fragments, inserting a word break in each location occupied by a code fragment identified as a word break;

concatenating adjacent text fragments into a new ordered list of words; and selecting the new list as the best ordered list.

15. The computer program product of claim 13, wherein the processor is additionally controlled to perform the operations of:

converting the unique code fragments to fixed length bit strings using a fingerprinting technique, prior to storing the code fragments as entries in the table.

16. A computer program product stored on a computer readable medium for extracting an ordered list of words from formatted text, the formatted text comprising text fragments and code fragments, the computer program product controlling a processor coupled to the medium to perform the operations of:

partitioning the text into text fragments and code fragments without interpreting the code fragments;

organizing the text fragments as arcs and the code fragments as nodes in a graph;

matching concatenations of adjacent text fragments against a word dictionary to determine possible paths through the graph; and selecting a particular path having the fewest number of arcs as representing a best ordering of the words of the formatted text.

17. The computer program product of claim 16, wherein the processor is additionally configured to perform the steps of:

responsive to a plurality of paths having the fewest number of arcs:

assigning a weight to each arc, such that the weight of each arc corresponds to a frequency with which the text fragment associated with the arc appears in the text of a representative set of documents;

comparing the weight of a first arc of a first path having the fewest number of arcs to the weight of a first arc of a second path having the fewest number of arcs;

responsive to the weight of the first arc of the first path having a greater weight, selecting the first path as representing the best ordering of the words of the formatted text;

responsive to the weight of the first arc of the second path having a greater weight, selecting the second path as representing the best ordering of the words of the formatted text;

responsive to the weight of the first arc of the first path being the same as the weight of the first arc of the second path, comparing the weight of each subsequent arc in the first path with the weight of each subsequent arc in the second path, and selecting as representing the best ordering of the words of the formatted text a path having a first occurrence of an arc with greater weight.

18. In a computer aided document conversion system for extracting an ordered list of words from formatted text, a computer memory readable by a processor in the system for selecting a best ordered list of words from a document containing mixed text fragments and formatting code fragments without interpreting the code fragments, comprising:

a list of code fragments extracted from the formatted text document;

a list of text fragments extracted from the formatted text document;

a dictionary of representative words;

at least one ordered list of text fragments extracted from the list of text fragments and concatenated to form words present in the dictionary of representative words; and a best ordered list selected from the ordered lists and containing the fewest number of words.

19. The computer memory of claim 18, further comprising:

a table of code fragments, containing a disjunction field indicating a number of times an associated code fragment is used to separate words, and a conjunction field, indicating a number of times the code fragment is used to concatenate adjacent text fragments into a word.

20. A data structure in computer memory, comprising:

a plurality of nodes representing formatting codes in a formatted document;

a first plurality of arcs connecting the nodes, each arc representing a word fragment; and a second plurality of arcs between ones of the nodes representing concatenated word fragments.

21. The data structure of claim 20, wherein each concatenation of word fragments forms a word present in a dictionary of representative words.

* * * * *

UNITED STATES PATENT AND TRADEMARK OFFICE
CERTIFICATE OF CORRECTION

PATENT NO. : 6,470,362 B1
DATED : October 22, 2002
INVENTOR(S) : Robert Eustace and Jeremy Dion It is certified that error appears in the above-identified patent and that said Letters Patent is hereby corrected as shown below:

<u>Title page,</u>
Item [56], References Cited, U.S. PATENT DOCUMENTS, add the following references:

-- 5,392,212 A * 2/1995   Geist………707/532
   5,878,385 A * 3/1999   Bralich et al. ……704/9 --.
and delete the following reference:
   "5,392,212 A * 2/1995   Bralich et al. ….704/9".

Signed and Sealed this

Eighteenth Day of March, 2003

JAMES E. ROGAN
*Director of the United States Patent and Trademark Office*